March 12, 1968 E. A. MELTZER 3,372,421
HEATED WINDSHIELD WIPER
Filed Dec. 21, 1965
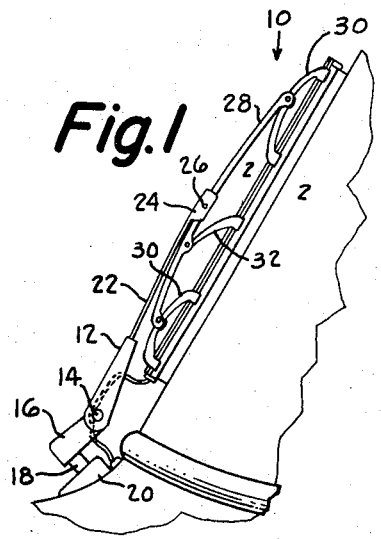
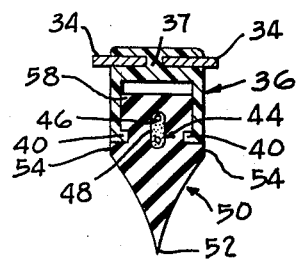
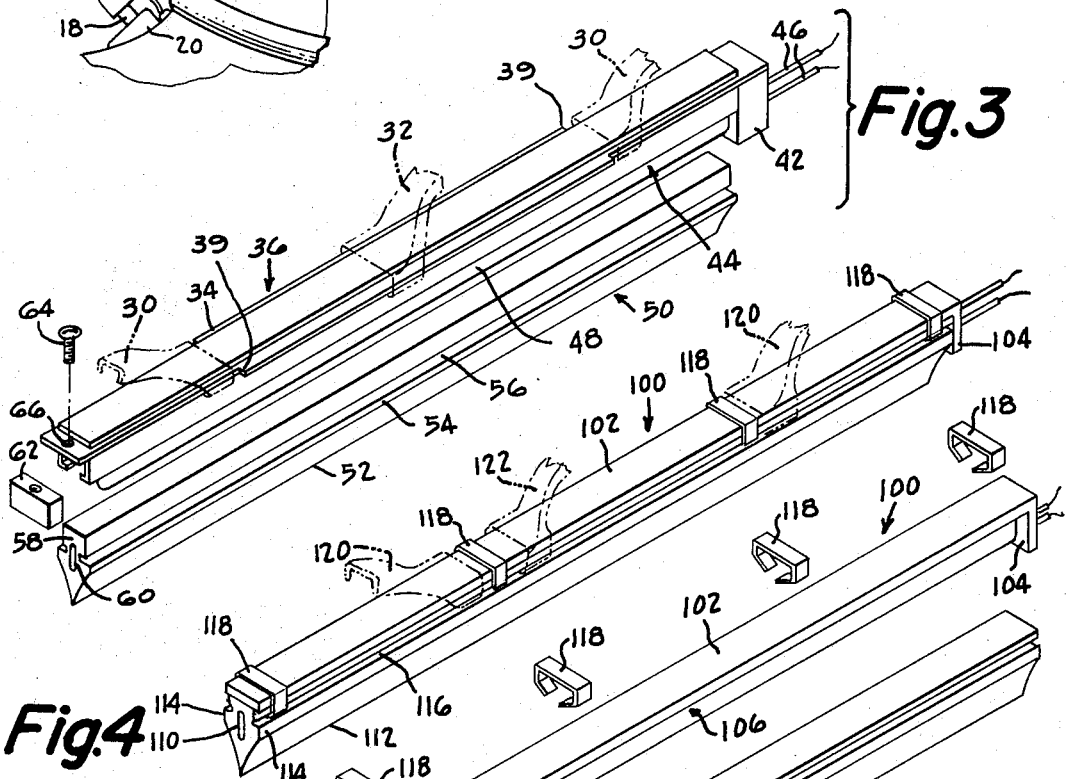
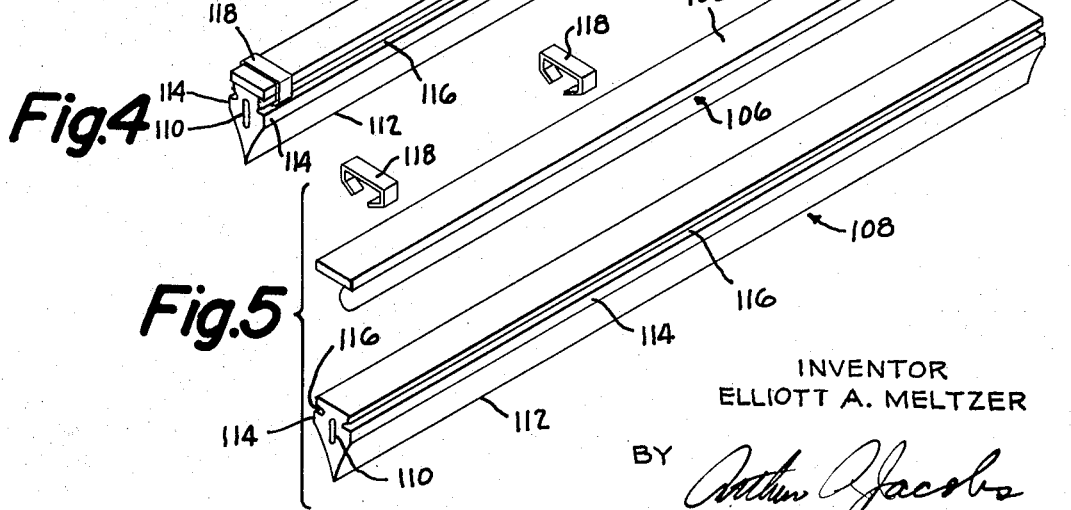
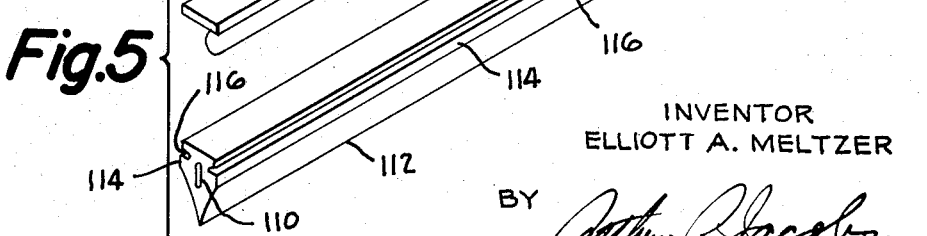
INVENTOR
ELLIOTT A. MELTZER
BY
ATTORNEY

United States Patent Office 3,372,421
Patented Mar. 12, 1968

3,372,421
HEATED WINDSHIELD WIPER
Elliott A. Meltzer, 8015 Cobden Road,
Laverock, Pa.
Filed Dec. 21, 1965, Ser. No. 515,376
7 Claims. (Cl. 15—250.06)

This invention relates to an improved windshield wiper for automatic vehicles and the like, and it more particularly relates to a windshield wiper having a heating element associated therewith.

Many windshield wipers have heretofore been developed which utilize the heat from an associated heating element for the purpose of melting ice from the wiper blade and from the corresponding area of the windshield. However, none of these prior devices have attained any appreciable commercial success for various reasons. For example, some of these previous devices have utilized a wiper assembly comprising two wiper blade portions with an air space therebetween. Since the blade portions were pressed against the windshield, they formed an essentially closed chamber trapping the enclosed air. The heating means acted to heat this trapped air. This heated air was supposed to provide sufficient warmth to thaw the blades and to defrost the windshield over which the blades moved. However, it is most inefficient to heat air because of its poor conductive qualities and the heating of the air consequently required the generation of a large amount of heat. This, in turn, required the utilization of large and expensive heating units. Even with such large heating units, however, both the blades and the windshields received an insufficient amount of heat because most of the generated heat was absorbed by the air in the chamber.

Other heated wiper blade devices utilized heating elements which were molded or otherwise permanently secured within the resilient wiper blade element itself. Although the heat was directly absorbed by the wiper blade itself and was therefore more efficiently utilized than in the above-described type of wiper devices, this type of blade assembly was also not commercially acceptable because whenever a wiper blade had to be replaced, the heating element had to first be disconnected from the electrical wiring, then the entire unit, including the heating element, had to be discarded, and finally a new unit had to be mounted in place and the electrical connection reestablished.

The necessity of discarding the whole unit, including the heating element, each time a replacement became necessary, made this type of device unduly expensive. Furthermore, it was not desirable to have to connect and disconnect the electrical connections each time a replacement was made.

Other prior devices placed a heating element in the blade holder or backing unit rather than in the blade itself. However, practically no effective heating of the blade itself could be obtained in this manner.

It is therefore one object of the present invention to provide a heated windshield wiper device that provides an efficient conduction of heat to the wiper blade itself, thereby requiring a minimum amount of heat energy.

Another object of the present invention is to provide a heated windshield wiper device wherein the wiper blade itself can be removed and replaced without the necessity of replacing the heating unit and without the necessity of connecting or disconnecting the electrical wiring.

Another object of the present invention is to provide a heated windshield wiper device which is relatively simple in construction, is relatively inexpensive and easy to manufacture, and is substantially free from maintenance problems.

Other objects and many of the attendant advantages of this invention will be readily appreciated as the same becomes better understood by reference to the following description when read in conjunction with the accompanying drawings wherein:

FIG. 1 is a side elevational view of a windshield wiper assembly embodying the present invention, the wiper assembly being illustrated in operative position on an automobile windshield.

FIG. 2 is a sectional view taken on line 2—2 of FIG. 1.

FIG. 3 is an exploded, top perspective view of the wiper blade unit provided in the assembly of FIG. 1.

FIG. 4 is a top perspective view of an alternative form of blade unit embodying the present invention.

FIG. 5 is an exploded, top perspective view of the unit of FIG. 4.

Referring now in greater detail to the various figures of the drawing wherein similar reference characters refer to similar parts, there is shown in FIGS. 1, 2 and 3 a windshield wiper assembly, generally designated 10, that comprises a wiper arm 12 pivotally connected at 14 to a bracket 16 mounted on an oscillating shaft 18 extending through a sleeve 20 to a standard oscillating mechanism (not shown). Extending from the arm 12 is a rod 22 that is releasably connected to a bracket 24. The bracket 24 is pivotally connected at 26 to the central portion of a yoke 28. The opposite ends of the yoke 28 are pivotally connected to separate arcuate arms 30 while, at an intermediate area, the yoke is pivotally connected to a curved arm 32.

The arms 30 and 32 are provided with clip portions at their lower ends, these clip portions being slidably but clampingly engaged under the corresponding edges of a flexible metal strip 34 that is secured to an elongated, hollow housing 36 constructed of a flexible but yet firm and strong material such as nylon, polyethylene, polypropylene, etc. The strip 34 is provided with a longitudinal slot 37 (shown in FIG. 2) which embraces an intermediate reduced portion of the housing 36 to form a connection therebetween. This connection may be by frictional engagement or the strip 34 may be molded into the groove formed by the reduced portion of the housing 36. The strip 34 is also provided with side indentations 38 at each end on each side. These indentations slidably accommodate the clip portions of the arms 30, while the inner ends of the indentations, indicated at 39, act as stops to limit longitudinal sliding movement of the arms 30.

The housing is provided with side walls, each of which has an inwardly-extending flange 40. These flanges 40 define a bottom slot in the housing 36.

At one end, the housing 36 is closed by a flange 42. Connected to this flange 42 and extending in spaced parallel relation to the housing is a heating element 44. This heating element 44 comprises a looped electrical wire 46 embedded in a sheath 48 of flexible, electrically insulative material such as asbestos, "Teflon," or the like. The ends of the wire 46 are adapted to be connected in an electrical circuit whereby one of the ends is connected to a source of electrical energy while the other is connected to ground.

Slidably engageable with the housing 36 is a wiper blade 50 of resilient material such as rubber or the like. When they are connected, the housing 36 forms a backer for the wiper blade.

The wiper blade 50 comprises an elongated body having a cross-section wherein the lower portion is outwardly and upwardly tapered from a narrow wiping edge 52 to straight side walls 54. Above the side walls 54 is provided a pair of oppositely-disposed longitudinal grooves 56. Above the grooves 56 is a rectangular portion 58. Extending longitudinally through the blade is an oval-shaped bore 60. This bore 60 is of a size and shape to slidably receive the heating element 44.

A collar 62 is releasably secured to the projecting, free end of the strip 34 by means of a set screw 64 adapted to pass through a hole 66 in the strip and to be threadedly engaged in a tapped hole 68 in the collar 62. The collar 62 is of a size and shape to correspond to the upper portion of blade 50 so that it does not interfere with the wiping action of the blade but acts to retain the blade against endwise movement and also acts as a stop to limit longitudinal sliding movement of the adjacent arm 30.

In use, the backer 36 and heating element 44 may be retained in connection with the yoke 28 even when replacement of a worn blade is necessary. In order to replace the blade it is merely necessary to disengage the set screw 64, remove the collar 62, and slide the blade out of the housing forming the backer. In this sliding movement, the flanges 40 act as rails which are in slidable engagement with the grooves 56 of the blade. A new blade is then positioned with the heating element 44 within the bore 60 and the flanges 40 within the grooves 56. The blade is then slid into position and the collar 62 secured in place.

With the above-described type of construction, not only is it necessary to replace only the relatively inexpensive blade, but no electrical connections need be disturbed. Furthermore, the replacement is effected with the least amount of manipulation and requires very little skill or dexterity.

In FIGS. 4 and 5 there is shown another form of the invention comprising a wiper blade unit, generally designated 100, where, instead of a hollow, molded housing, the backer comprises a flexible metal strip 102 having a flange 104 at one end. A heating element 106, similar to that shown at 44, is connected to the flange 104 and extends parallel with but spaced from the strip 102.

A wiper blade 108 of resilient material is slidably connected to the backer 102 by means of a longitudinal bore 110 of a size and shape to slidably receive the heating element 106. The blade 108 has a lower portion of a cross-sectional shape wherein it tapers upwardly and outwardly from a wiper edge 112 to a rectangular portion defined by straight walls 114. Above the walls 114 are provided a pair of opposed grooves 116. Above the grooves 116 is a solid portion having a flat upper surface to mate with the flat lower surface of the backer 102. A plurality of removable clips 118 are releasably engageable with the grooves 116 to secure the blade to the backer. These clips also serve as stops to limit longitudinal slidable movement of the yoke arms 120 and 122.

Obviously, many modifications of the present invention are possible in the light of the above teachings. It is, therefore, to be understood that within the scope of the appended claims, the invention may be practiced otherwise than as specifically described.

The invention claimed is:

1. A windshield wiper assembly comprising a backer, means for connecting said backer to a movable support arm, a heater support means operatively connected to said backer, a heating element secured to said heater support means and extending parallel with but in spaced relation to said backer, a resilient wiper blade having a longitudinal bore therein, said blade having a longitudinally slidable connection with said backer, and said heating element being slidably encompassed by said bore when said blade is slidably connected and disconnected from said backer.

2. The assembly of claim 1 wherein said backer is flexible.

3. The assembly of claim 1 wherein said heating element is an electrically energizable heating unit.

4. The assembly of claim 1 wherein said heating element is flexible.

5. The assembly of claim 1 wherein said backer comprises a hollow housing having longitudinal track means, and said blade is slidably movable within said housing, said blade having groove means slidably engageable with said track means while said blade slides within said housing.

6. The assembly of claim 1 wherein said backer comprises a flat strip, said blade being releasably secured to said strip by releasable clamp means.

7. The assembly of claim 6 wherein said blade is provided with oppositely disposed longitudinal grooves to receive said clamp means.

References Cited

UNITED STATES PATENTS

| | | | |
|---|---|---|---|
| 1,980,254 | 11/1934 | Cartwright | 15—250.6 |
| 2,703,902 | 3/1955 | Thomas et al. | 15—250.9 |
| 2,746,077 | 5/1956 | Higgins | 15—250.6 X |

ANTHONY BARTIS, *Primary Examiner.*